Dec. 28, 1965  D. R. HARMON  3,226,201
APPARATUS FOR TREATING IRRIGATION WATER
Filed Feb. 7, 1963

DARRELL R. HARMON
INVENTOR

Huebner & Worrel
ATTORNEYS

United States Patent Office 3,226,201
Patented Dec. 28, 1965

3,226,201
APPARATUS FOR TREATING IRRIGATION WATER
Darrell R. Harmon, Lemoore, Calif., assignor to William W. Cornforth, Reedley, Calif.
Filed Feb. 7, 1963, Ser. No. 257,375
2 Claims. (Cl. 23—262)

This invention relates to apparatus for and a process of treatment of irrigation water. The invention particularly relates to the process of adding sulfur compounds in a gaseous form to water intended for irrigation purposes and also relates to apparatus capable of performing such a process.

In most of the areas which utilize irrigation as a source of crop moisture, an accumulation of undesirable elements and compounds normally attend such irrigation. For example, the United States Department of Agriculture Bulletin No. 190, entitled "Salt Problems In Irrigated Soils" (1958) announced that more than seven million acres of irrigated land in the United States had been adversely affected by salt and/or sodium accumulation. A significant portion of such accumulation results from improper irrigation practices. Other portions of this accumulation are due to the use of irrigation water of poor quality. The United States Department of Agriculture Bulletin No. 197, entitled "Determining The Quality Of Irrigation Water" (1958) lists calcium sulfate, sodium sulfate, sodium sulfate, sodium bicarbonate, sodium chloride and other undesirable compounds as occurring in many irrigation waters, and also sets forth the recommended maximum permissible levels for such compounds in satisfactory irrigation waters. As is well-known to persons skilled in the art of irrigation, most salts lose their identity when dissolved in water by separating into ions. By using poor quality irrigation water, an excessive accumulation of bicarbonate ions ($HCO_3$) occurs in irrigated soil. Such an accumulation is considered toxic to growing plants, adversely affects the productivity of the soil, and in aggravated cases renders it unusable for agricultural uses.

In addition to the problem of accumulated salts and bicarbonate ions, many irrigated soils are low in nitrogen and experience an intolerable increase in the pH level as the alkalinity increases. In many cases, the irrigation water itself is above the recommended pH level which further aggravates the alkalinity of the soil.

Certain soil amendments can be employed to correct conditions existing with excessive accumulations of salts and sodium. Commonly accepted amendments are gypsum and sulfur and are normally employed in conjunction with leaching of the soil by supplying water in excess of normal crop needs and flushing it off where a drainage area is available. Such a corrective process is expensive and time consuming and does not prevent the condition from subsequently arising. Accordingly, it is generally recognized that it is more economically sound and more advisable from an agricultural point of view to utilize good quality water for irrigation purposes and to employ sound irrigation practices to prevent aggravated accumulations of undesirable salts in the soil, rather than attempting to correct such a condition. However, a good supply of satisfactory irrigation water is not always available, and many ranchers have, of necessity, used water below a minimum recommended level of quality.

Accordingly, it is an object of the present invention to provide apparatus capable of treating water considered unsatisfactory as irrigation water to render it acceptable for such use.

Another object is to provide apparatus for treating irrigation water which ultimately reduces the amount of bicarbonates in the water as well as the soil irrigated thereby.

Another object is to increase the amount of available plant food in the form of sulfates in irrigation water.

Another object is to lower the pH of water used for irrigation purposes.

Another object is to provide apparatus capable of treating irrigation water and producing a noticeable increase in the available nitrogen in the soil.

A further object is to provide apparatus capable of treating irrigation water to render agriculture more economical and productive in semi-arid regions.

A further object is to provide apparatus for adding sulfur in a gaseous form to irrigation water thereby to improve the quality of such water.

A still further object is to provide a process of treating natural water of poor quality and converting it to high quality irrigation water.

These, together with other objects, will become more fully apparent upon reference to the following description and accompanying drawing.

Figure 1:
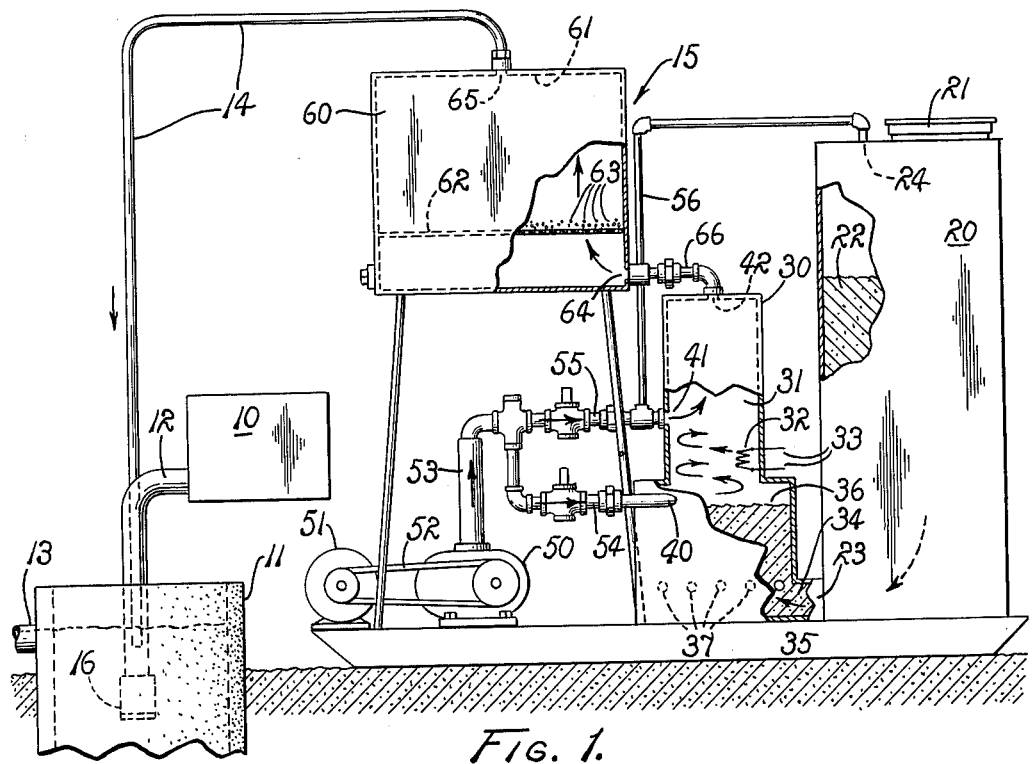
FIG. 1 is a side elevation of apparatus capable of treating irrigation water and embodying the principles of the present invention, parts being broken away for illustrative purposes.
Figure 2:
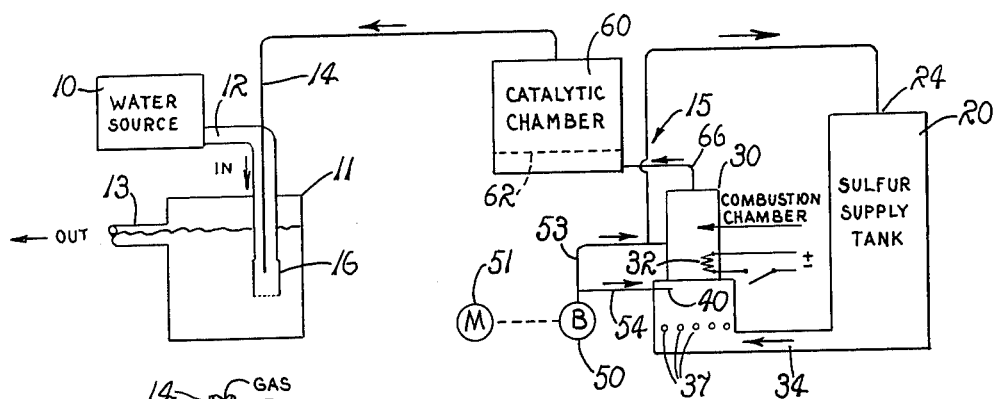
FIG. 2 is a schematic drawing of the apparatus of FIG. 1 showing diagramamtically the flow patterns in practicing the process of the present invention.

Referring more particularly to FIGS. 1 and 2, a source of raw, untreated water is indicated at 10 and connected to a treating tank 11 by means of a water inlet conduit 12. The tank 11 affords a water treatment zone of predetermined depth by positioning a water outlet 13 at an optimum distance above the bottom of the tank. A gas admission conduit 14 is connected between the water treatment tank 11 and gas producing apparatus, generally indicated at 15. A diffuser 16 is secured to the outlet end of the water conduit 12 to insure maximum absorption by the water of the gas introduced into the treating tank 11.

The gas producing apparatus 15 includes a vertically disposed substantially cylindrical sulfur supply hopper 20, having an admitting door 21 adapted to close the tank to form a substantially hermetically sealed enclosure. A predetermined quantity of sulfur 22 is placed in the hopper as a batch charge through the admission door 21. The sulfur is preferably in a powdered flowable form to permit gravitational movement of the sulfur through the hopper and discharge through a port 23 located near the bottom thereof. An air inlet port 24 is provided in the upper end of the hopper 20 and is normally disposed above the level of a charge of sulfur placed in the hopper.

A primary oxidizing housing 30 provides an internal heating chamber 31 of substantially upright cylindrical form. Ignition means in the form of a resistance coil schematically indicated at 32 is disposed within the heating chamber and connected to a source of electric current, not shown, by means of a pair of conductors 33. The housing 30 is also provided with a sulfur inlet orifice 34 disposed near the bottom of the housing and in communication with a conduit 35 leading from the sulfur discharge port 23 of the hopper 20. For normal use, the hopper is charged with a sufficient quantity of sulfur to maintain a level of sulfur, indicated at 36, in the heating chamber 31. A heat exchanger 37 is disposed in the heating chamber 31 and is adapted to be connected to a source of cooling fluid, not shown, to maintain the sulfur upstream from the heat exchanger at a temperature below the ignition temperature of sulfur, which is approximately 250° C.

The housing 30 is also provided with a lower first air inlet 40 positioned at approximately the maintained level 36 of the sulfur in the heating chamber and is disposed relative thereto to effect a tangential admission of air flowing through the orifice 40. A second air inlet orifice 41 is spaced elevationally above the first orifice to provide an excess of air in relation to that required to support combustion of the sulfur in the chamber 31. A combustion gas outlet 42 is formed in the top of the housing 30 to permit escape of the gases resulting from the combustion and attendant oxidation of the sulfur.

To provide a sufficient quantity of air in the combustion chamber 31 and for other purposes subsequently to be described, a blower 50 is connected in driving relationship to a motor 51 by a suitable power transmission belt 52. In a commercial embodiment of the invention, the blower 50 is in the form of a commercially available Roots-type blower; other forms of air motivating devices equivalent to the blower 50 can be employed satisfactorily. It should be noted that the motor 51 is operated at a speed sufficient for the blower to provide the quantity of air required to oxidize the sulfur in the chamber 31 and to effect a gas velocity flowing through conduit 14 and discharged through the diffuser 16 approximately twice that of the water also flowing through the diffuser.

The blower 50 is connected with an output conduit 53 which delivers air under pressure from the blower to a plurality of branch conduits 54, 55, and 56. The branch conduits 54, 55 and 56 are connected respectively to the first and second air inlet orifices 40 and 41 of the heating chamber and to the air inlet port 24 of the sulfur hopper 20.

A second housing 60 encloses an oxidizing chamber 61 in which is supported a perforate tray 62. The tray is adapted to permit movement therethrough of combustion gases while supporting thereon a plurality of discrete particles 63 of a suitable catalytic agent. Examples of catalytic agents which have been employed successfully are ferric oxide ($Fe_2O_3$) and aluminum oxide ($Al_2O_3$). Exceedingly good results have been obtained by using a catalytic agent consisting of ferric oxide and aluminum oxide in equal proportions by weight. The housing 60 is provided with a gas inlet orifice 64 positioned below the tray 62 thereby to provide an upwardly directed path of flow of the combustion gases to an outlet orifice 65 in communication with the gas conduit 14 leading to the diffuser 16. A conduit 66 interconnects the outlet orifice 42 of the heating chamber 31 to the inlet orifice 64 of the oxidizing chamber 61.

Figure 3:
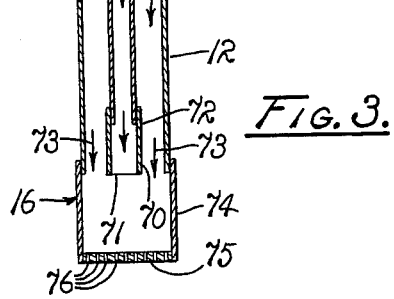
FIG. 3 is an enlarged fragmentary view of the diffuser of the apparatus of FIG. 1.

The details of the diffuser 16 are more clearly shown in FIG. 3 wherein a sleeve 70 formed of a non-corrodible metal, such as lead, is rigidly secured to the conduit 16 to provide an outlet orifice 71 for the gas produced in the combustion chamber 31. Such combustion gas is directed by the sleeve in a predetermined path, indicated by the arrows 72 disposed substantially concentrically of a cylindrical circumscribing sleeve 73 forming an outer wall of the diffuser. Accordingly, water admitted through the inlet conduit 12 is constrained to flow in an annular path, indicated by the arrows 74, relative to the path 72 of the gas flow. As stated above, the motor and blower are operated at a speed relative to the volumetric capacity of the blower and the cross-sectional area of the sleeve 70 at the orifice 71 to effect a gas velocity in the path 72 substantially twice that of the water velocity in the path 74. A perforate diffuser disc 75 is secured to the end of the sleeve 73 in substantially sealing relationship and provides a plurality of axially directed passageways 76 to aid in the diffusing of the gas in the raw water. The disc 75 is preferably formed of a chemically inert substance such as an epoxy resin reinforced with glass fibers and available commercially under th trademark "Fiberglas." It should be noted that the diffuser is disposed below the surface of the water, which is determined by the location of the outlet conduit 13. Accordingly, the treating zone in the tank 11 extends a sufficient distance to obtain the maximum utilization of the gas discharged from the outlet orifice 71.

*Operation*

The operation of the described embodiment of the subject invention is believed to be readily apparent and is briefly summarized at this point. A predetermined charge of sulfur 22 is admitted to the hopper 20 through door 21, which is subsequently closed to provide a substantially hermetically sealed enclosure. An electric current is subsequently passed through resistance coil 32 to effect initial combustion of the sulfur indicated at the level 36. Concurrently, the motor 51 is operated to drive the blower 50 and supply air to the heating chamber 31 through the tangentially directed orifice 40 and the upper orifice 41. Also, air under pressure from the blower is admitted to the upper part of the hopper 20 through the conduit 56 and air inlet port 24. This insures a substantially uniform movement of the sulfur 22 downwardly through the hopper and through conduit 35. Accordingly, the level 36 of the burning sulfur is maintained substantially in the same zone throughout the operation of the apparatus.

The current supplied to the coil 32 can be interrupted upon initiation of combustion. Other forms of satisfactory combustion initiating devices will readily occur to those skilled in the art. The heat exchanger 37 is connected to a source of cooling fluid, not shown, to insure maintenance of the temperature of the sulfur upstream therefrom at a value below the combustion temperature.

An excess of air over that required for combustion is supplied to the heating chamber 31 through air inlet orifice 41. The combustion of the sulfur elevates the temperature thereof and facilitates rapid oxidation due to the abundant supply of oxygen in the chamber 31. Accordingly, the combustion gas discharged through outlet port 42 is rich in sulfur dioxide. Also, unidentified nitrogen compounds are formed during the heating of the sulfur and the air in the combustion chamber. Although unidentified, these nitrogen compounds have been observed to be beneficial to crops growing in land irrigated by water treated by the present invention. Also, a significant continued increase in the nitrogen content of such a soil has been observed by chemical analysis of such soil at periodic intervals following irrigation by water treated by the apparatus and in accordance with the process of the present invention.

The combustion gases admitted to the oxidizing chamber through conduit 66 and inlet orifice 64 are further oxidized while their temperature remains elevated. Due to the action of the discrete particles 63 of suitable catalytic agents, such as those described above, the sulfur dioxide in the combustion gas is changed to sulfur trioxide ($SO_3$). The oxidized combustion gas is then conducted to the diffuser 16 where a major portion of the gas is absorbed by the irrigation water in the treating zone of the tank 11. Typical chemical reaction occurring in the combustion chamber, oxidizing chamber, and the treating tank 11 are as follows:

$$S + O_2 \rightarrow SO_2 + O \rightarrow SO_3 + H_2O \rightarrow H_2SO_4$$

The bicarbonate ($HCO_3$), including sodium bicarbonates ($NaHCO_3$) are reacted as follows:

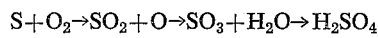

If desired, the combustion gases can be employed directly from the chamber 31 so that subsequent contact with the raw water will result in the formation of sulfurous acid ($H_2SO_3$). Typical chemical reactions occurring in such a situation upon subsequent contact with bicarbonate ions ($HCO_3$) are as follows:

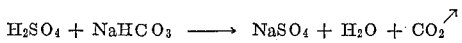
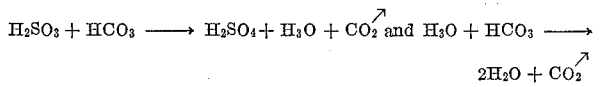

Accordingly, a decrease in the sodium bicarbonate is effected while building up the sodium sulfate which is highly desirable as a plant nutrient. $CO_2$ in excess of the saturation level of the water escapes to the atmospheres as it bubbles through the treating zone of tank 11.

Set forth below is a comparative analysis of water normally employed in a raw untreated condition and selected from a source of supply of water previously used for irrigation purposes. Such an untreated sample is compared to a sample of water from the same source following treatment by apparatus embodying the principles of the present invention and capable of practicing the process described herein, such sample being recovered at a point downstream from the treating tank and flowing in an open irrigation ditch.

|  | Untreated | Treated |
|---|---|---|
| pH | 8.2 | 5.6 |
| Carbonates ($CO_3$), p.p.m | Nil | Nil |
| Bicarbonates ($HCO_3$), p.p.m | 341.6 | 61.0 |
| Chlorides (Cl), p.p.m | 148.9 | 148.9 |
| Sulphates ($SO_4$), p.p.m | 2.5 | 237.9 |
| Silica ($SiO_4$), p.p.m | 27.0 | 42.0 |
| Iron and Alumina ($R_2O_3$), p.p.m | 28.0 | 20.0 |
| Calcium (Ca), p.p.m | 13.3 | 15.0 |
| Magnesium (Mg), p.p.m | 6.0 | 8.0 |
| Sodium (Na), p.p.m | 179.2 | 179.6 |
| Boron (B), p.p.m | 0.25 | 0.30 |
| Total solids (Residue), p.p.m | 580.0 | 686.0 |
| Total hardness (as $CaCO_3$), p.p.m | 58.2 | 70.8 |
| Total hardness (as $CaCO_3$), g.p.g | 3.4 | 4.1 |
| Alkali coefficient | 5.1 | 22.3 |
| Percent sodium | 78.0 | 76.8 |
| Classification | Poor | Good |

It will be noted that a slight increase was observed in the above chemical analysis in the silica, calcium and magnesium content of the treated water. This increase probably was received from the irrigation ditch itself and is regarded as irrelevant to the invention.

Of extreme importance is the drastic reduction in bicarbonates from above a level considered toxic by the United States Department of Agriculture to a level well below that considered tolerable by plants. Stated in a percentage, the process and apparatus of the present invention effected an 82% reduction in the bicarbonates contained in the raw untreated water.

Also of extreme significance is the increase in the quantity of sulfates contained in the treated water. As can be seen by the above side-by-side comparison, the apparatus and process of the invention increases the amount of sulfates almost a hundredfold.

In experiments conducted with the apparatus and process described above, an increase in cotton grown per acre on soil irrigated by such treated water has been observed to increase from 1.7 bales per acre prior to treatment of the irrigation water to 3.06 bales per acre following treatment. It has been estimated that the aforesaid beneficial results of sulfur provided by the present apparatus and process can be obtained by using only 20% of the quantity of sulfur required in order to achieve the same results by using previously available soil amendment processes. Accordingly, the invention permits an efficient and most economical application of sulfur to irrigated soil.

Other benefits observed in land irrigated by water treated by the present apparatus and process have been improved water penetration, a releasing of rare elements for plant utilization, reducing the pH of the irrigation water as well as the soil subsequently irrigated thereby, and observed fixation of nitrogen in the soil after an extended period of time following irrigation by water treated as described above.

Accordingly, the present invention has been found to possess great utility and value in the treatment of raw water previously unacceptable for use in irrigation. Also, it provides a process of treating water which has noticeable effects on the productivity of the coil and lasting benefits in the physical and chemical characteristics of the soil.

Although the invention has been herein shown and described in what is conceived to be the most practical and preferred process and apparatus, it is recognized that departures may be made therefrom with the scope of the invention, which is not to be limited to the details disclosed herein but is to be accorded the full scope of the claims so as to embrace any and all equivalent processes and apparatus.

Having described my invention, what I claim as new and desire to secure by Letters Patent is:

1. An apparatus for treating irrigation water comprising a combustion chamber having upper and lower end portions; a substantially hermetically sealed supply hopper having upper and lower end portions mounted adjacent to the combustion chamber and adapted to receive flowable powdered sulfur; a sulfur conduit interconnecting the lower end portions of the hopper and the chamber for gravitational flow of sulfur from the hopper to the chamber whereby the sulfur forms a substantially U-shaped column having opposite ends in the chamber and the hopper; a catalytic tank disposed above the combustion chamber containing a catalytic bed of ferric oxide and aluminum oxide and connected to the upper end portion of the chamber at a position below the bed; a gas conduit having an intake end connected to the catalytic tank above the catalytic bed and an extended end; a gas diffuser mounted on the extended end of the gas conduit and adapted to be immersed in irrigation water to diffuse the gas in said water; an air compressor; a conduit connected to the compressor and to the chamber above the surface of the sulfur therein and having a branch connected to the hopper above the surface of the sulfur in the hopper; means in said conduit to regulate air supply to the chamber and to the hopper; and means for igniting the upper surface of the sulfur in the chamber, the compressor being adapted to supply air for combustion to the chamber, to maintain the air pressures on opposite ends of the column of sulfur under substantially equal pressure, and having sufficient pressure to force the products of combustion through the catalytic tank and into the irrigation water.

2. An apparatus for treating irrigation water comprising a combustion chamber having upper and lower end portions; a substantially hermetically sealed supply hopper having upper and lower end portions, mounted adjacent to the combustion chamber, and adapted to receive flowable powdered sulphur; a sulphur conduit interconnecting the lower end portions of the hopper and the chamber for gravitational flow of sulphur from the hopper to the chamber; a catalytic tank disposed above the combustion chamber containing a catalytic bed and connected at a position below the bed to the upper end portion of the chamber; a gas conduit having an intake end connected to the catalytic tank above the catalytic bed and an extended end providing a discharge orifice; a substantially cylindrical sleeve mounted substantially concentrically about the extended end of the gas conduit, with said discharge orifice of the gas conduit disposed within the sleeve; a perforate disk mounted in the sleeve in endwardly spaced relation to the orifice of the gas conduit, said sleeve and extended end of the gas conduit being adapted for immersion in irrigation water; an air compressor; a conduit connected to the compressor, to the chamber above the surface of the sulphur therein, and to the hopper above the surface of the sulphur in the hopper; means for igniting the sulphur in the chamber; valve means in said compressor conduit adapted to regulate air supply to the chamber and to the hopper to maintain substantially equal pressures on the sulphur therein, said compressor providing sufficient pressure to force the products of combustion through the catalytic tank and out of the orifice of the gas conduit; and means for forcing irrigation water through the sleeve and out of the perforations of the disk at a velocity approximately one-half of that of the velocity of the gas discharged from the orifice.

References Cited by the Examiner

UNITED STATES PATENTS

| | | | |
|---|---|---|---|
| 692,008 | 1/1902 | Frolich et al. | 23—175 X |
| 1,152,458 | 9/1915 | Waggoner | 261—77 X |
| 1,337,561 | 4/1920 | Lyon | 23—278 |
| 2,171,203 | 8/1939 | Urbain et al. | 210—59 X |
| 2,310,187 | 2/1943 | Axelrad et al. | 23—179 X |
| 2,756,986 | 7/1956 | Schytil et al. | 266—20 |
| 2,807,522 | 9/1957 | Russell | 23—278 |
| 2,925,335 | 2/1960 | Donath. | |
| 3,027,321 | 3/1962 | Selm et al. | 210—59 |
| 3,029,201 | 4/1962 | Brown et al. | 210—59 |

FOREIGN PATENTS

| | | |
|---|---|---|
| 1,229,953 | 3/1960 | France. |
| 191,596 | 11/1907 | Germany. |
| 296,751 | 9/1928 | Great Britain. |

OTHER REFERENCES

"Sulphur Burner," Ulmer et al., Chemical Engineering, January 1949, page 95.

MORRIS O. WOLK, Primary Examiner.